United States Patent
Kim et al.

(10) Patent No.: US 8,934,781 B2
(45) Date of Patent: Jan. 13, 2015

(54) OPTICAL SUBSCRIBER NETWORK

(75) Inventors: Sung Chang Kim, Gwangju-si (KR); Jong Deog Kim, Daejeon (KR); Dong Soo Lee, Gwangju-si (KR); Hark Yoo, Gwangju-si (KR); Geun Yong Kim, Goyang-si (KR); Young Suk Lee, Gwangju-si (KR); Mun Seob Lee, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 735 days.

(21) Appl. No.: 13/213,742

(22) Filed: Aug. 19, 2011

(65) Prior Publication Data

US 2012/0045210 A1 Feb. 23, 2012

(30) Foreign Application Priority Data

Aug. 19, 2010 (KR) .................. 10-2010-0080498
Aug. 18, 2011 (KR) .................. 10-2011-0082210

(51) Int. Cl.
*H04B 10/00* (2013.01)
*H04Q 11/00* (2006.01)
*H04L 12/24* (2006.01)

(52) U.S. Cl.
CPC ........ *H04Q 11/0067* (2013.01); *H04L 41/0893* (2013.01); *H04L 41/0833* (2013.01); *H04Q 2011/0079* (2013.01); *Y04S 40/162* (2013.01)
USPC ............................. 398/153; 398/140; 398/168

(58) Field of Classification Search
None
See application file for complete search history.

(56) References Cited

U.S. PATENT DOCUMENTS

| 7,583,898 B1 * | 9/2009 | Dalton et al. ................. 398/100 |
| 2009/0263127 A1 * | 10/2009 | Haran et al. .................... 398/38 |
| 2010/0111523 A1 * | 5/2010 | Hirth et al. ...................... 398/25 |

FOREIGN PATENT DOCUMENTS

| CN | 1846373 A | 10/2006 |
| CN | 101562760 A | 10/2009 |
| JP | 2009-260970 | 11/2009 |
| KR | 10-2005-0059986 A | 6/2005 |
| KR | 10-2009-0033327 A | 4/2009 |
| KR | 10-2009-0041163 A | 4/2009 |
| WO | WO-2005022781 A1 | 3/2005 |

* cited by examiner

*Primary Examiner* — Darren E Wolf
(74) *Attorney, Agent, or Firm* — Rabin & Berdo, P.C.

(57) ABSTRACT

An optical subscriber network for power reduction is provided. The optical subscriber network may include an Optical Line Terminal (OLT) and an Optical Network Terminal (ONT). The OLT may manage a plurality of ONTs by classifying the plurality of ONTs into a sleep group, and may multicast a sleep allowance message only to ONTs included in a predetermined sleep group.

14 Claims, 7 Drawing Sheets

OPTICAL SUBSCRIBER NETWORK

CROSS-REFERENCE TO RELATED APPLICATION

This application claims the benefit of Korean Patent Application No. 10-2010-0080498, filed on Aug. 19, 2010, in the Korean Intellectual Property Office, Korean Patent Application No. 10-2011-0082210, filed on Aug. 18, 2010, in the Korean Intellectual Property Office, the disclosures of which are incorporated herein by reference.

BACKGROUND

1. Field of the Invention

The present invention relates to an optical communication network, and more particularly, to an optical communication network including an Optical Line Terminal (OLT), and at least one Optical Network Terminal (ONT) accessing the OLT.

2. Description of the Related Art

Countries the world over are making every effort to reduce a green-house gas production and energy consumption in order to alleviate climate change. The information technology (IT)_fields are no exception, and various green IT technologies are being discussed at standardization organizations. In particular, in network fields, power consumption of subscriber networks accounts for 80% of the entire network power consumption. Most of all, considering that power consumption of an Optical Network Terminal (ONT) that is used in every home accounts for 60% of the entire network power consumption, a power reduction technique for the ONT in the optical subscriber network has a great ripple effect.

Among various optical subscriber network technologies, Gigabit Passive Optical Network (GPON) and 10-Gigabit Passive Optical Network (XGPON) are next generation optical subscriber network technologies. The GPON and XGPON technologies have been standardized by the International Telecommunications Union-Telecommunication Standardization Sector (ITU-T), and commercially serviced rapidly in North America and Europe. These technologies have an advantage in that an increase in interoperability and a simple operability management are possible using an ONT Management Control Interface (OMCI) which has a strong control and management function.

The ITU-T recognizes a necessity for power reduction in the next generation optical subscriber network, and publishes a White Paper regarding a power reduction technique, as a guideline for future standardization tasks. The power reduction technique which has been discussed as standards based on the White Paper provides two types of modes, that is, a dozing mode and a cyclic sleep mode. The dozing mode is a method of periodically powering a transmission unit of the ONT on/off, in a state where a reception unit of the ONT is constantly powered on, which has an advantage in that a stable operation may be possible despite low efficiency in power reduction. The cyclic sleep mode is a method of periodically powering both the transmission unit and the reception unit of the ONT on/off, which has a disadvantage in that a loss of traffic which is input when the reception unit is powered off may occur, however, has an advantage in that efficiency of the power consumption may be improved.

SUMMARY

According to an aspect of the present invention, there is provided an Optical Line Terminal (OLT) including a grouping unit to classify at least one Optical Network Terminal (ONT) into at least one sleep group, and a transmission unit to multicast a sleep mode allowance message to ONTs included in a single sleep group.

According to another aspect of the present invention, there is provided an ONT including a reception unit to receive, from an OLT, a sleep mode allowance message that may be multicast to a first sleep group including the ONT.

According to still another aspect of the present invention, there is provided an ONT including a reception unit to receive data stored in a sleep buffer when the ONT is switched from a sleep mode to a normal mode. The data to be transmitted to the ONT may be buffered in the sleep buffer of an OLT when the ONT is in the sleep mode.

In a general aspect, a plurality of ONTs may be managed using a simple protocol.

In another aspect, a sleep buffer of an OLT may be efficiently managed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
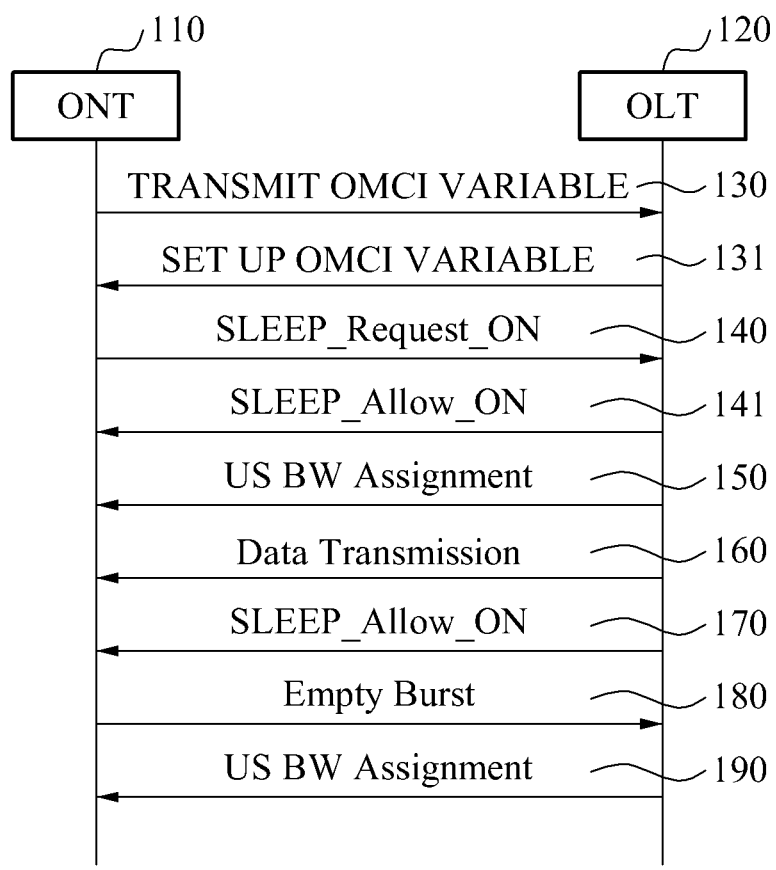
FIG. 1 is a flowchart illustrating a message flow in a power reduction technique according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating a message flow in a power reduction technique according to an embodiment of the present invention. FIG. 1 illustrates a process by which an Optical Network Terminal (ONT) 110 is switched from a sleep mode to a dozing mode or a cyclic sleep mode, in particular.

In operation 130, the ONT 100 may be initialized, and may transmit an ONT Management Control Interface (OMCI) variable to an Optical Line Terminal (OLT) 120. Here, the OMCI variable may include variables associated with power reduction of the ONT 110.

In operation 131, the OLT 120 may acquire the OMCI variable, and may set up the acquired OMCI variable. The variables associated with the power reduction may include a sleep interval and an active interval. In the dozing mode, the sleep interval may refer to a time interval where a transmission unit of the ONT 110 may be powered off. In the cyclic sleep mode, the sleep interval may refer to a time interval where both the transmission unit and a reception unit may be powered off. The active interval may refer to a time interval where both the transmission unit and the reception unit may be powered on. The following descriptions will be made on the assumption that the ONT 110 may be in the cyclic sleep mode.

In operation 140, the ONT 110 may monitor traffic of the transmission unit and the reception unit, and may transmit, to the OLT 120, a sleep mode allowance message, for example, a Sleep_Request_ON message requesting a switch to the sleep mode, that is, the cyclic sleep mode when no traffic is monitored during a predetermined period of time.

In operation 141, the OLT 120 may allow a switch to the sleep mode of the ONT 120 by transmitting a response message, for example, a Sleep_Allow_ON message, in response to the sleep mode allowance message.

The ONT 110 receiving the response message may immediately proceed with switching to the sleep mode corresponding to the sleep interval set up using the OMCI.

After transmitting the response message, the OLT 120 may periodically transmit, to the ONT 110, minimum upstream link bandwidth information, for example, an upstream bandwidth map in operation 150, so that the ONT 110 may rapidly perform a normal operation when a predetermined event occurs.

In operation 160, the OLT 120 may store data to be transmitted to the ONT 110, in a sleep buffer when the ONT 110 is in the sleep mode. When the ONT 110 is switched from the sleep mode to the normal mode, the OLT 120 may transmit the data stored in the sleep buffer, when the ONT 110 is awake.

After the data transmission is completed, in operation 170, the OLT 120 may transmit, to the ONT 110, a sleep mode allowance message allowing a switch back to the sleep mode, for example, a Sleep_Allow_ON message. The sleep mode allowance message, for example, a Sleep_Allow_ON message received during the active interval within a sleep cycle, may indicate that the ONT 110 is allowed to maintain the sleep mode.

In operation 180, the ONT 110 may transmit, to the OLT 120, an Empty Burst as an acknowledgement (ACK) message indicating that the ONT 110 is being operated normally, and may be switched to the sleep mode.

In operation 190, the ONT 110 may maintain the sleep mode, and the OLT 120 may periodically transmit, to the ONT 110, the upstream link bandwidth information, for example, the upstream bandwidth map.

Figure 2:
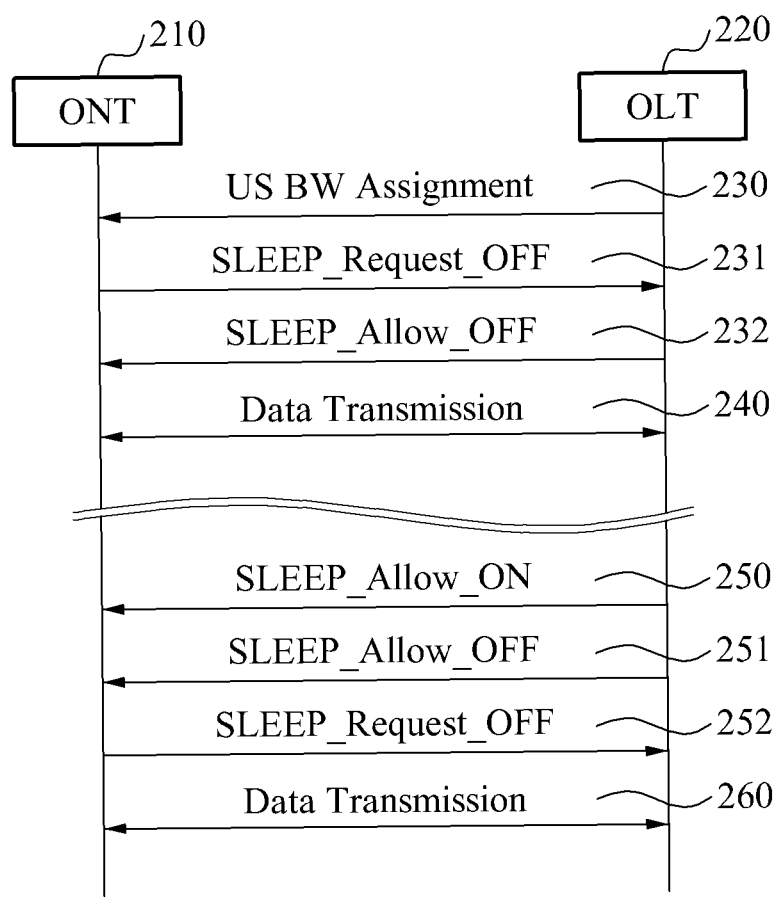
FIG. 2 is a flowchart illustrating a message flow in a power reduction technique according to another embodiment of the present invention.

FIG. 2 is a flowchart illustrating a message flow in a power reduction technique according to another embodiment of the present invention. FIG. 2 illustrates a process by which an ONT 210 is switched from a sleep mode, such as a dozing mode, a cyclic mode, or the like to a normal mode.

In operation 230, a local event may occur in the ONT 210 when a receiver of an Internet phone is picked up, a PC is turned on, and an Internet Protocol Television (IPTV) and the like are switched on. In this instance, the ONT 210 may be immediately switched to the normal mode, and may receive an upstream bandwidth allocation message.

When the ONT 210 receives the upstream bandwidth allocation message, the ONT 210 may transmit, to an OLT 220, a message requesting a switch to the normal mode, for example, a Sleep_Request_OFF message, in operation 231.

In operation 232, the OLT 220 may transmit, to the corresponding ONT 210, a message allowing the switch of the ONT 210 to the normal mode, for example, a Sleep_Allow_OFF message.

In operation 240, the ONT 210 in the normal mode, and the OLT 220 may transmit and receive data.

In operation 250, the OLT 220 may transmit a message allowing maintenance of the sleep mode again, for example, a Sleep_Allow_ON message.

When the OLT 220 calls an Internet phone call, and the like, a local event may occur in the OLT 220. In this instance, in operation 251, the OLT 220 may transmit, to the ONT 210, a message requesting an immediate suspension of the sleep mode and a switch to the normal mode, for example, a Sleep_Allow_OFF message.

In operation 252, the ONT 210 receiving the message from the OLT 220 may be switched to the normal mode immediately, and may transmit a response message, for example, a Sleep_Request_OFF message to the OLT 220. Here, the OLT 220 may determine that the corresponding ONT 210 is switched to the normal mode when the response message is received.

In operation 260, data transmission may be normally performed between the OLT 220 and the ONT 210.

Figure 3:
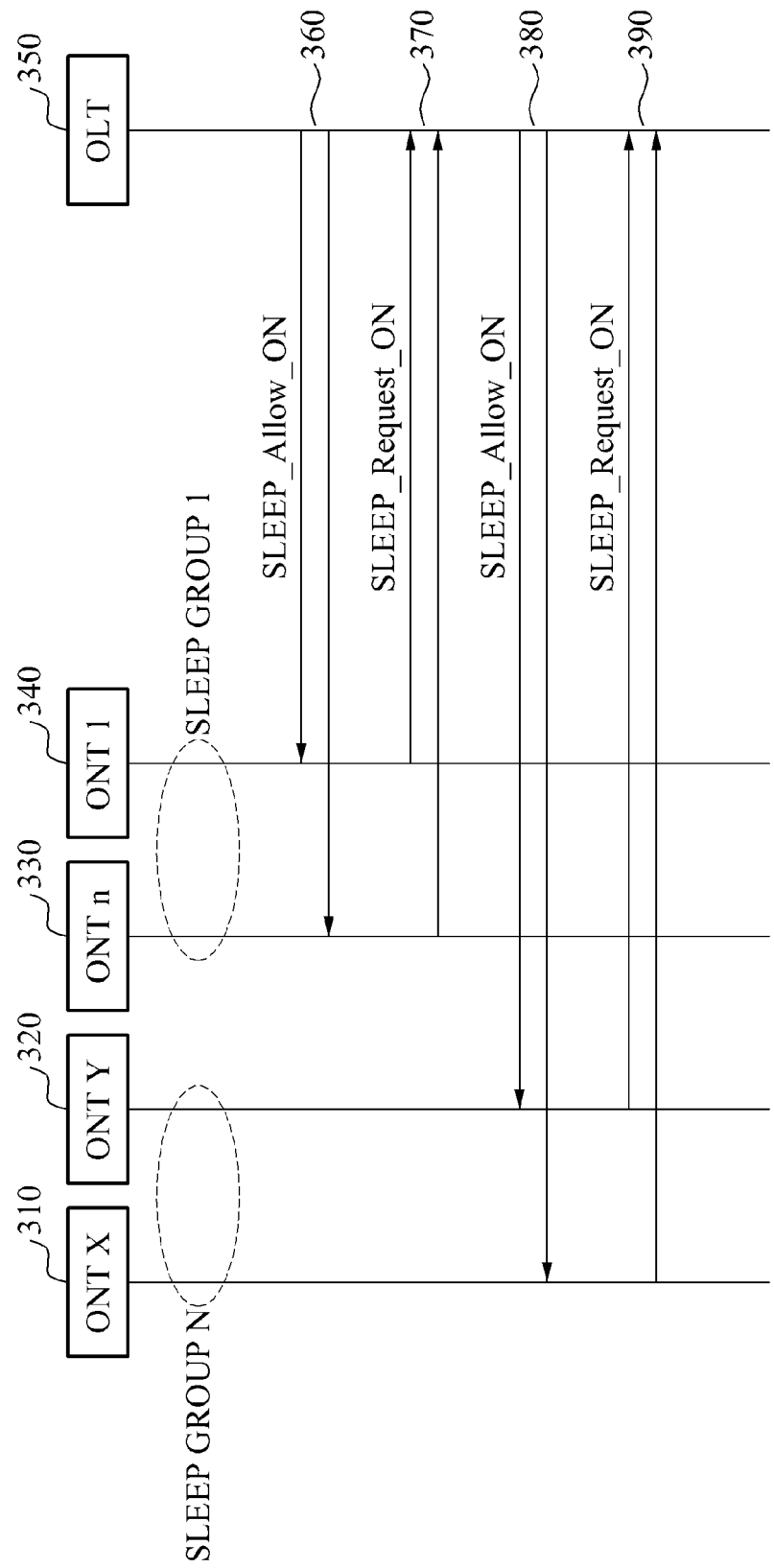
FIG. 3 is a flowchart illustrating a message flow in a power reduction technique according to still another embodiment of the present invention.

FIG. 3 is a flowchart illustrating a message flow in a power reduction technique according to still another embodiment of the present invention. Although FIG. 3 corresponds to an embodiment about a cyclic sleep mode, the embodiment is applicable to a dozing mode as well, and accordingly the following description will relate to the cyclic sleep mode only.

When a new ONT accesses an OLT 350, the OLT 350 may collect information about the new ONT using an OMCI. Also, the OLT 350 may allocate a multicast identifier for a predetermined sleep group, to the new ONT. In FIG. 3, it may be assumed that a multicast identifier for a sleep group 1 may be 1, and a multicast identifier for a sleep group N may be n. Also, in order to manage ONTs, an ONT X 310 and an ONT Y 320 may be classified into the sleep group N, and an ONT n 330 and an ONT 1 340 may be classified into the sleep group 1.

In operation 360, a sleep mode allowance message, for example, a Sleep_Allow_ON message for the sleep group 1 may be transmitted to the ONT 1 340 and the ONT n 330 only, and may not be transmitted to the ONT X 310 and the ONT Y 320 which are included in another sleep group. That is, the sleep mode allowance message may be multicast to the ONT 1 340 and ONT n 330.

In operation 370, the ONT 1 340 and the ONT n 330 receiving the sleep mode allowance message may respectively unicast, to the OLT 350, a response message, for example, a Sleep_Request_ON message.

Similarly, in operation 380, a sleep mode allowance message, for example, a Sleep_Allow_ON message for the sleep group N may be transmitted to the ONT X 310 and the ONT Y 320 only.

In operation 390, the ONT X 310 and the ONT Y 320 may respectively unicast, to the OLT 350, a response message for the sleep mode allowance message.

Advantages that may be obtained using a sleep group including a plurality of ONTs, for example, the ONT X 310, the ONT Y 320, the ONT n 330, and the ONT 1 340, are as follows.

First, in a conventional technique, the OLT 350 may manage sleep modes for each of the ONT X 310, ONT Y 320, ONT n 330, and ONT 1 340 individually. Accordingly, timers and state machines corresponding to a number of the ONTs, for example, the ONT X 310, ONT Y 320, ONT n 330, and ONT 1 340 may be required. However, the advantage of using the sleep group is in that required resources of hardware and software may be reduced, thereby easily configuring the sleep modes of the ONTs. As the simplest method, when a sleep group is set to 1, the OLT 350 may manage all of the ONTs, for example, the ONT X 310, ONT Y 320, ONT n 330, and ONT 1 340 using a single timer and a single state machine.

Second, a number of times that a sleep allowance message transmitted downstream, for example, a Sleep_Allow_ON message is transmitted by the OLT 350 may be reduced, by classifying all of the ONTs, for example, the ONT X 310, ONT Y 320, ONT n 330, and ONT 1 340 into a sleep group. Thus, a wireless resource of downstream link may be efficiently used, and a data bandwidth of the downstream link may be increased.

Figure 4:
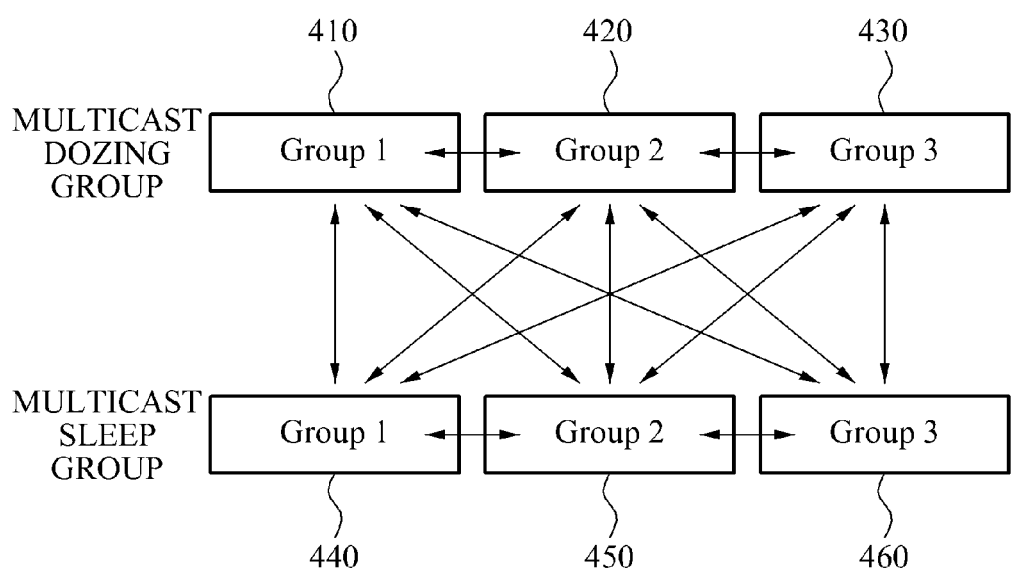
FIG. 4 is a diagram illustrating movement of an Optical Network Terminal (ONT) from a sleep group to another sleep group according to an embodiment of the present invention.

FIG. 4 is a diagram illustrating movement of an ONT from a sleep group to another sleep group according to an embodiment of the present invention. Referring to FIG. 4, sleep groups 410, 420, and 430 indicate sleep groups where a dozing mode may be applied, and sleep groups 440, 450, and 460 indicate sleep groups where a cyclic sleep mode may be applied. Here, movement of an ONT from a sleep group to another sleep group may be possible by updating an already allocated identifier for the sleep group to be an identifier for the other sleep group to move to.

The movement from the sleep group to the other sleep group may be classified on two bases, an ONT basis and an OLT basis.

With regard to the ONT basis, a sleep cycle timer may be set for an ONT. The sleep cycle timer may be started from a point of time when the corresponding ONT is included in a predetermined sleep group. When the timer is terminated, the corresponding ONT may transmit, to an OLT, a message requesting a movement to another sleep group having a sleep interval longer than a sleep interval of the sleep group which the corresponding ONT is currently included in.

When there is a sleep group having a sleep interval longer than a sleep interval of the sleep group which the corresponding ONT is currently included in, the OLT receiving the request may transmit, to the corresponding ONT, an identifier for the corresponding sleep group. In this instance, the ONT may move to the corresponding sleep group by setting the received identifier as a multicast identifier of the ONT.

An active interval may be equally determined, and the sleep interval may be determined differently, for each sleep group. A sleep group having the shortest sleep interval may correspond to the lowermost sleep group, and a sleep group having the longest sleep interval may correspond to the uppermost sleep group.

On the OLT basis, the OLT may change a sleep group of the ONT based on traffic profile of the ONT, or state information about a sleep buffer included in the OLT.

According to a traffic profile-based method, the OLT may analyze traffic of the ONT and may generate statistical data, according to a predetermined time unit. Here, the OLT may reclassify or change the sleep group of the ONT based on the generated statistical traffic analysis data.

For example, in regard to an ONT operated in a sleep group where the dozing mode is currently applied, the OLT may generate statistical traffic analysis data of the corresponding ONT according to a predetermined time unit. According to the generated statistical traffic analysis data, an amount of traffic used may be considerably reduced at a later time. In this instance, power reduction efficiency may increase when the OLT may move the ONT to a sleep group where the cyclic sleep mode is applied.

According to a method using the state information about the sleep buffer of the OLT, in a case of an ONT included in a sleep group where the sleep mode is currently applied, when an amount of sleep buffer used is greater than a predetermined value, the OLT may move the corresponding ONT to the sleep group where the dozing mode is applied, thereby preventing packet loss, and maintaining a more stable performance.

Figure 5:
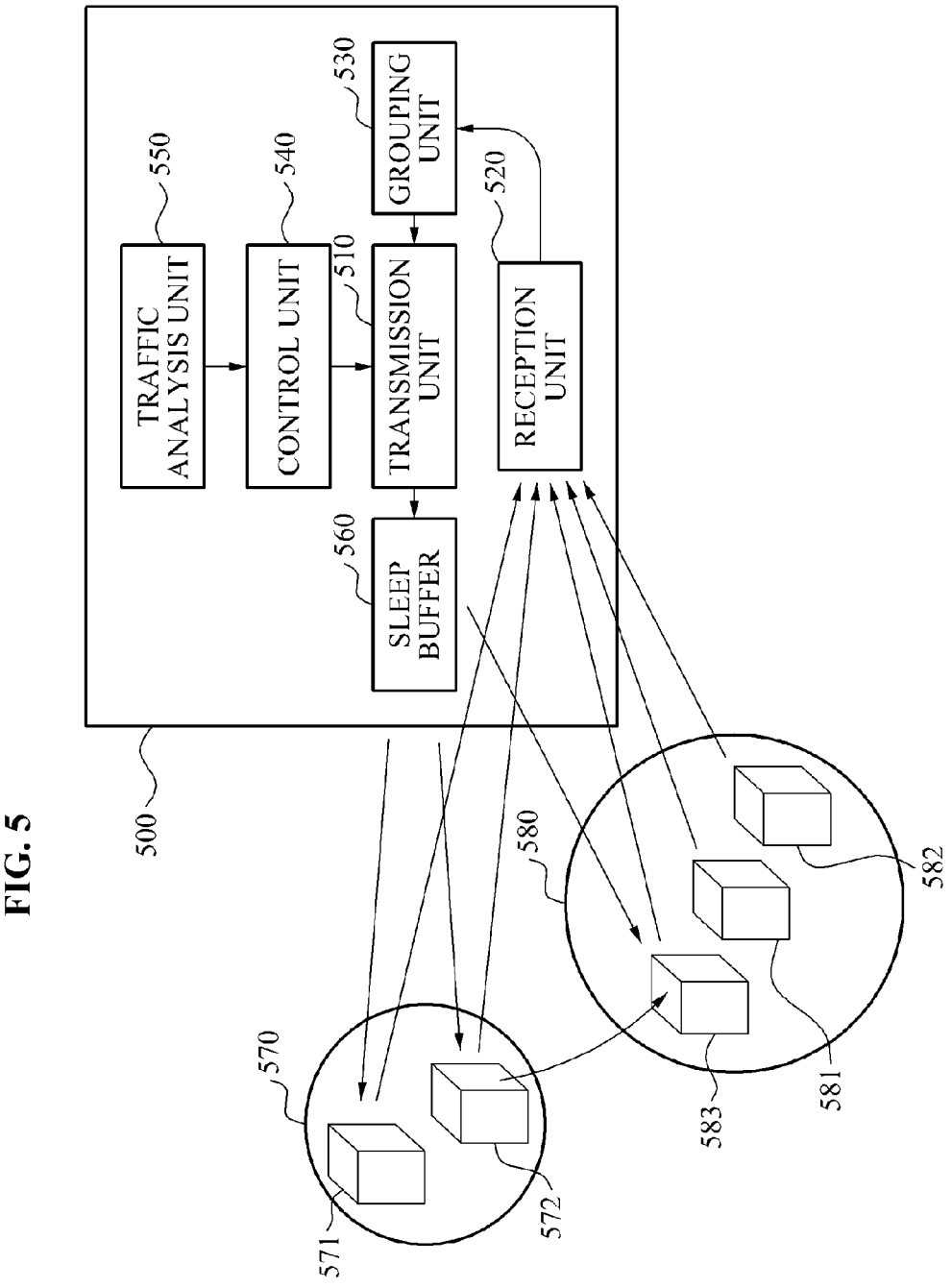
FIG. 5 is a block diagram illustrating a configuration of an Optical Line Terminal (OLT) according to an embodiment of the present invention.

FIG. 5 is a block diagram illustrating a configuration of an OLT 500 according to an embodiment of the present invention. Referring to FIG. 5, the OLT 500 may include a transmission unit 510, a reception unit 520, a grouping unit 530, a control unit 540, a traffic analysis unit 550, and a sleep buffer 560, The grouping unit 530 may classify at least one Optical Network Terminal (ONT), for example, ONTs 571, 572, 581, and 582, into at least one sleep group, for example, sleep groups 570 and 580. In this instance, the grouping unit 530 may determine identifiers for identifying each of the sleep groups 570 and 580. The transmission unit 510 may transmit the identifiers for the sleep groups 570 and 580 including the ONTs 571, 572, 581, and 582, to the ONTs 571, 572, 581, and 582 included in each of the sleep groups 570 and 580.

The transmission unit 510 may multicast a sleep mode allowance message to the ONTs 571, 572, 581, and 582 included in the sleep groups 570 and 580. A sleep mode allowance message transmitted to a predetermined sleep group may only be transmitted to ONTs included in the predetermined sleep group. For example, a sleep mode allowance message transmitted to a first sleep group, for example, the sleep group 570 may only be transmitted to the ONTs 571 and 572 included in the first sleep group, for example, the sleep group 570, and may not be transmitted to the ONTs 581 and 582 included in a second sleep group, for example, the sleep group 580.

The reception unit 520 may receive a response message unicast from each of the ONTs 571 and 572 transmitting the sleep mode allowance message. Here, the response message may correspond to a response message for the sleep mode allowance message.

The OLT 500 may classify the plurality of ONTs 571, 572, 581, and 582 into the small number of sleep groups 570 and 580, and may multicast the sleep mode allowance message only to the ONTs 571, 572, 581, and 582 included in the predetermined sleep group. The sleep mode allowance message may not be transmitted to ONTs included in another sleep group. Accordingly, hardware complexity of the OLT 500 may be reduced, and a rate of transmission band used may be improved.

The reception unit 520 may acquire a variable related to power saving for each of the ONTs 571, 572, 581, and 582 using an OMCI protocol. In this instance, the grouping unit 530 may classify the ONTs 571, 572, 581, and 582 based on the acquired variable related to power saving. The variable related to power saving may include a sleep interval or an active interval.

The ONTs 571 and 572 included in the first sleep group, for example, the sleep group 570 may move to the second sleep group. The OLT 500 may receive a movement request from each of the ONTs 571, 572, 581, and 582, and may reclassify each of the ONTs 571, 572, 581, and 582 when the movement request satisfies a predetermined standard.

As an example, the control unit 540 may move the ONT 572 to the second sleep group, for example, the sleep group 580, based on a standard for the ONT 572 included in the first sleep group, for example, the sleep group 570.

A sleep interval may be determined for each of the first sleep group, for example, the sleep group 570, and the second sleep group, for example, the sleep group 580. Also, a timer may be set for each of the ONTs 571, 572, 581, and 582.

For example, a timer for the ONT 572 may be started from a point in time when the ONT 572 is included in the first sleep group, for example, the sleep group 570. When the ONT 572 maintains the sleep mode from the point in time when the timer for the ONT 572 is started to a point in time when the timer is terminated, the control unit 540 may reclassify the ONT 572 into the second sleep group, for example, the sleep group 580 having a sleep interval longer than a sleep interval of the first sleep group, for example, the sleep group 570. In this instance, the ONT 572 may become the ONT 583 newly included in the second sleep group, for example, the sleep group 580.

As another example, the control unit 540 may move the ONT 572 to the second sleep group, for example, the sleep group 580, based on a standard for the ONT 572 included in the first sleep group. As another example, the control unit 540 may move the ONT 572 to the second sleep group, for example, the sleep group 570, according to a standard for the OLT 500.

For example, the control unit 540 may move the ONT 572 based on traffic profile. Statistical traffic analysis data generated by analyzing traffic of the ONT 572 according to a predetermined time unit may be used as the traffic profile.

The traffic analysis unit 550 may generate the statistical traffic analysis data. The control unit 540 may predict future traffic of the ONT 572 based on the statistical traffic analysis data. When it is predicted that the traffic of the ONT 572 may be reduced, and the ONT 572 may be in the sleep mode for a longer time in the future, the control unit 540 may reclassify the ONT 572 included in the first sleep group, for example, the sleep group 570, into the second sleep group, for example, the sleep group 580 having a sleep interval longer than a sleep interval of the first sleep group, for example, the sleep group 570. In this instance, the ONT 572 may become the ONT 583 newly included in the second sleep group, for example, the sleep group 580.

As another example, the control unit 540 may move the ONT 572 based on an amount of buffer for the ONT 572. As an example, when the amount of buffer used exceeds a first threshold, the control unit 540 may predict that the ONT 572 may be in the sleep mode for a shorter time. In this instance, the control unit 540 may change the sleep group 570 including the ONT 572 into the second sleep group, for example, the sleep group 580. The sleep interval of the second sleep group, for example, the sleep group 580 may be shorter than the sleep interval of the first sleep group, for example, the sleep group 570.

As still another example, when the amount of buffer used is less than a second threshold, the control unit 540 may predict that the ONT 570 may be in the sleep mode for a longer time. In this instance, the control unit 540 may change the sleep group 570 including the ONT 572 into the second sleep group, for example, the sleep group 580. The sleep interval of the second sleep group, for example, the sleep group 580 may be longer than the sleep interval of the first sleep group, for example, the sleep group 570.

When the ONT 572 is in the sleep mode, the ONT 570 may not receive data. In this instance, the OLT 500 may buffer the data to be transmitted to the ONT 572 in the sleep buffer 560. When the ONT 572 terminates the sleep mode, and is shifted to the normal mode, the data stored in the sleep buffer 560 of the OLT 500 may be transmitted to the ONT 572.

The plurality of ONTs 571, 572, 581, and 582 may access the OLT 500. Accordingly, the plurality of ONTs 571, 572, 581, and 582 may maintain the sleep mode. In this instance, the sleep buffer may need to be divided, and allocated to the plurality of ONTs 571, 572, 581, and 582 in the sleep mode.

The sleep buffer may be allocated to ONTs in the sleep mode equally, based on a number of the ONTs in the sleep mode. For example, when it is assumed that an entire area of the sleep buffer corresponds to C, and the number of the ONTs in the sleep mode corresponds to M, a C/M area from the entire area of the sleep buffer may be allocated to each of the ONTs in the sleep mode.

The sleep buffer may be included in each sleep group based on a number of the sleep groups including the ONTs in the sleep mode. When it is assumed that an entire area of the sleep buffer corresponds to C, and the number of the sleep groups including the ONTs in the sleep mode corresponds to N, a C/N area from the entire area of the sleep buffer may be allocated to each of the sleep groups.

For example, it may be assumed that the ONTs 571, 572, and 581 may be in the sleep mode. In this instance, the number of the ONTs 571, 572, 581 in the sleep mode corresponds to 3, and the number of the sleep groups 570 and 580 including the ONTs in the sleep mode corresponds to 2. A C/2 area of the sleep buffer may be allocated to each of the sleep groups 570 and 580. The ONTs included in the first sleep group, for example, the sleep group 570 may share the area of the sleep buffer allocated to the sleep group 570.

That is, an area of the sleep buffer may be first used by each of the ONTs in proportion to an allocation rate determined in relation to the sleep buffer. For example, when the allocation rate determined in relation to the sleep buffer is p (0<p<1), each of ONTs in the sleep mode may first use the sleep buffer corresponding to a size pC.

Figure 6:
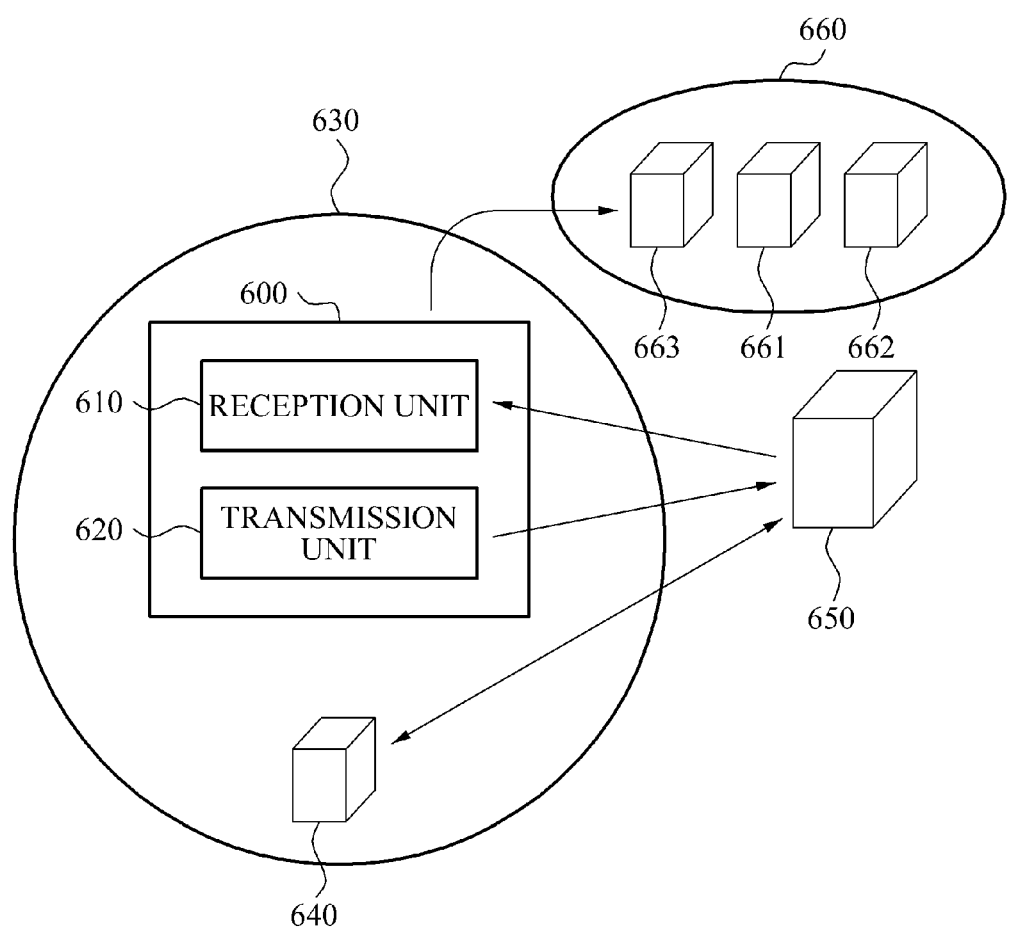
FIG. 6 is a block diagram illustrating a configuration of an ONT according to an embodiment of the present invention.

FIG. 6 is a block diagram illustrating a configuration of an ONT 600 according to an embodiment of the present invention. Referring to FIG. 6, the ONT 600 may include a reception unit 610, and a transmission unit 620.

The ONT 600 may access an OLT 650, along with other ONTs 640, 661, and 662. The ONTs 600, 640, 661, and 662 may be classified into a plurality of sleep groups 630 and 660. The ONT 600 may be included in the first sleep group 630, along with the ONT 640.

The reception unit 610 may receive, from the OLT 650, a sleep mode allowance message multicast to the first sleep group 630 including the ONT 600. The sleep allowance message may be transmitted to the ONTs 600 and 640 included in the first sleep group, however, may not be transmitted to the ONTs 661 and 662 included in the second sleep group 660.

The ONTs 600 and 640 may receive the sleep mode allowance message, and may determine whether the sleep mode allowance message corresponds to a sleep mode allowance message for each of the ONTs 660 and 640. When the sleep mode allowance message corresponds to a sleep mode allowance message for the ONT 600, the ONT 640 may not respond to the sleep mode allowance message.

The ONT 600 may be switched from a normal mode to a sleep mode, in accordance with the sleep mode allowance message. When the ONT 600 is already in the sleep mode, the ONT 600 may maintain the sleep mode.

The transmission unit 620 may unicast, to the OLT, a response message for the sleep mode allowance message in response to the sleep mode allowance message.

The reception unit 620 may receive a multicast identifier for the first sleep group 630 from the OLT 650. Also, the ONT 640 may receive the multicast identifier for the first sleep group 630. The multicast identifier may indicate a sleep group including each of the ONTs 600 and 640. When the sleep group including each of the ONTs 600 and 640 is changed, each of the ONTs 600 and 640 may receive another multicast identifier for the changed sleep group.

According to an aspect of the present invention, the sleep group including the ONT 600 may be changed based on a timer set in relation to the ONT 600. A sleep interval may be determined for each of the first sleep group 630 and the second sleep group 660. The timer may be started from a point in time when the ONT 600 is included in the first sleep group 630. When the ONT 600 maintains the sleep mode from the point in time when the timer is started to a point in time when the timer is terminated, the ONT 600 may be reclassified from the first sleep group 630 into the second sleep group 660.

According to another aspect of the present invention, the sleep group including the ONT 600 may be changed based on traffic profile. Statistical traffic analysis data generated by analyzing traffic of the ONT 600 according to a predetermined time unit may be used as the traffic profile.

When it is predicted that the traffic of the ONT 600 may be reduced, and the ONT 600 may be in the sleep mode for a longer time in the future, the ONT 600 may be reclassified from the first sleep group 630 into the second sleep group 660 having a sleep interval longer than a sleep interval of the first sleep group 630.

According to another aspect of the present invention, the ONT 600 may move to another sleep group based on an amount of buffer for the OLT 650. As an example, the amount of buffer used exceeds a first threshold, it may be predicted that the ONT 600 may be in the sleep mode for a shorter time. In this instance, the ONT 600 may move from the first sleep group 630 to the second sleep group 660. The sleep interval of the second sleep group 660 may be shorter than the sleep interval of the first sleep group 630.

As another example, when the amount of buffer used is less than a second threshold, it may be predicted that the ONT 600 may be in the sleep mode for a longer time. In this instance, the ONT 600 may move from the first sleep group 630 to the second sleep group 660, and becomes a new ONT 663 in the second sleep gourp. The interval of the second sleep group 660 may be longer than the sleep interval of the first sleep group 630.

Figure 7:
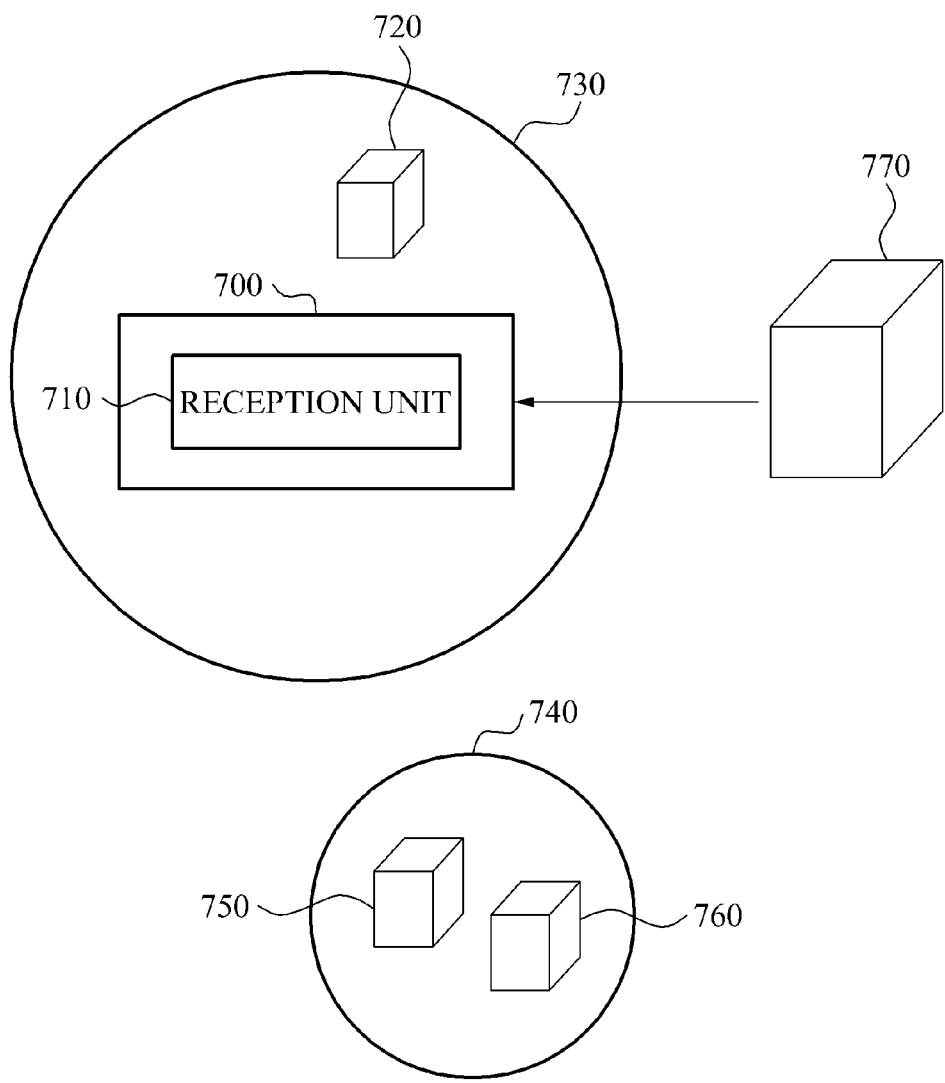
FIG. 7 is a block diagram illustrating a configuration of an ONT according to another embodiment of the present invention.

FIG. 7 is a block diagram illustrating a configuration of an ONT 700 according to another embodiment of the present invention. Referring to FIG. 7, the ONT 700 may include a reception unit 710.

The ONT 700 and ONTs 720, 750, and 760 may access an OLT 770, and may receive data from the OLT 770 or transmit data to the OLT 770.

In order to reduce power consumption, the ONT 700 may be switched from a normal mode in which data transmission and reception may be possible, to a sleep mode in which the data transmission and reception may be impossible.

When the ONT 700 is in the sleep mode, the ONT 700 may not receive data. Accordingly, in this instance, the OLT 770 may buffer the data to be transmitted to the ONT 700, in a sleep buffer. When the ONT 700 terminates the sleep mode, and is shifted to the normal mode, the data stored in the sleep buffer of the OLT 770 may be transmitted to the ONT 700. The reception unit 710 may receive the data stored in the sleep buffer when the ONT 700 is switched from the sleep mode to the normal mode.

The plurality of ONTs 700, 720, 750, and 760 may access the OLT 770. Accordingly, the plurality of ONTs 700, 720, 750, and 760 may maintain the sleep mode. In this instance, the sleep buffer may need to be divided, and allocated to the plurality of ONTs 700, 720, 750, and 760 in the sleep mode.

The sleep buffer may be allocated to ONTs in the sleep mode equally, based on a number of the ONTs in the sleep mode. For example, when it is assumed that an entire area of the sleep buffer corresponds to C, and the number of the ONTs in the sleep mode corresponds to M, a portion, C/M, of the entire area of the sleep buffer may be allocated to each of the ONTs in the sleep mode.

The sleep buffer may be included in each sleep group based on a number of the sleep groups including the ONTs in the sleep mode. When it is assumed that an entire area of the sleep buffer corresponds to C, and the number of the sleep groups including the ONTs in the sleep mode corresponds to N, the portion C/N of the entire area of the sleep buffer may be allocated to each of the sleep groups.

For example, it may be assumed that the ONTs 700, 720, and 750 may be in the sleep mode. In this instance, the number of the ONTs in the sleep mode corresponds to 3, and the number of the sleep groups including the ONTs in the sleep mode corresponds to 2. A C/2 area of the sleep buffer may be allocated to each of the sleep groups 730 and 740. The ONTs included in the sleep group 730 may share the area of the sleep buffer allocated to the sleep group 730.

An area of the sleep buffer may be first used by each of the ONTs in proportion to an allocation rate determined in relation to the sleep buffer. For example, when the allocation rate determined in relation to the sleep buffer is p ($0<p<1$), each of ONTs in the sleep mode may first use the sleep buffer corresponding to a size pC.

The transmission and reception method according to exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An Optical Line Terminal (OLT), comprising:
  a grouping unit configured to classify a plurality of Optical Network Terminals (ONTs) into a plurality of sleep groups, at least a first sleep group of which includes more than one ONT;
  a transmission unit configured to multicast a sleep mode allowance message to all ONTs included in the first sleep group; and a control unit configured to reclassify a first ONT in the first sleep group into a second sleep group of the plurality of sleep groups, wherein the first sleep group and the second sleep group respectively have a first sleep interval and a second sleep interval that is longer than the first sleep interval, and the control unit reclassifies the first ONT into the second sleep group when a timer for the first ONT, which is started from a point in time when the first ONT is included in the first sleep group, is terminated, the first ONT maintaining a sleep mode from the point in time when the timer is started to a point in time when the timer is terminated.

2. The OLT of claim 1, further comprising:
a reception unit configured to receive a response message, responding to the sleep mode allowance message, that is unicast from each of the ONTs in the first sleep group.

3. The OLT of claim 1, wherein the transmission unit transmits, to each of the ONTs in the first sleep group, a multicast identifier identifying the first sleep group.

4. The OLT of claim 1, further comprising:
a traffic analysis unit generating statistical traffic analysis data of the ONTs according to a predetermined time unit, wherein the control unit reclassifies the first ONT upon detecting that the statistical traffic analysis data predicts reduced traffic for the first ONT.

5. The OLT of claim 1, wherein the control unit reclassifies the first ONT when an amount of buffered data for the first ONT exceeds a predetermined threshold.

6. The OLT of claim 1, further comprising:
a sleep buffer configured to temporarily store data to be transmitted to a first ONT of the plurality of ONTs when the first ONT is in a sleep mode, wherein the transmission unit transmits the data stored in the sleep buffer to the first ONT when the first ONT is switched from the sleep mode to a normal mode.

7. The OLT of claim 1, further comprising:
a sleep buffer configured to temporarily store data to be transmitted to ones of the plurality of ONTs that are in a sleep mode, the ONTs in the sleep mode sharing the sleep buffer equally.

8. The OLT of claim 1, further comprising:
a sleep buffer configured to temporarily store data to be transmitted to ones of the sleep groups including ONTs in a sleep mode, the ones of the sleep groups sharing the sleep buffer equally.

9. The OLT of claim 6, further comprising a control unit that determines an allocation rate in relation to the sleep buffer, wherein an area of the sleep buffer is first used by each of the ONTs in proportion to the allocation rate.

10. An Optical Network Terminal (ONT), comprising:
a reception unit to receive, from an Optical Line Terminal (OLT), a sleep mode allowance message that is multicast to a first sleep group including the ONT and at least another ONT, wherein the ONT is reclassified by the OLT from the first sleep group into a second sleep group, the reception unit receives, from the OLT, a multicast identifier for the second sleep group, the first sleep group and the second sleep group respectively have a first sleep interval and a second sleep interval that is longer than the first sleep interval, and the ONT is reclassified from the first sleep group into the second sleep group when a timer for the ONT, which is started from a point in time when the ONT is included in the first sleep group, is terminated, the ONT maintaining a sleep mode from the point in time when the timer is started to a point in time when the timer is terminated.

11. The ONT of claim 10, further comprising:
a transmission unit to unicast, to the OLT, a response message for the sleep mode allowance message.

12. The ONT of claim 10, wherein the reception unit receives, from the OLT, a multicast identifier for the first sleep group.

13. The ONT of claim 10, wherein the ONT is reclassified from the first sleep group into the second sleep group upon detecting that statistical traffic analysis data of the ONT according to a predetermined time unit predicts reduced traffic for the ONT.

14. The ONT of claim 10, wherein the ONT is reclassified from the first sleep group into the second sleep group when an amount of buffered data for the ONT exceeds a predetermined threshold.

* * * * *